T. ADAMS.
Feed-Bags for Horses.

No. 141,686.

Patented August 12, 1873.

Witnesses,
Chas. H. Smith
Geo. F. Pinckney

Inventor
Thomas Adams
Lemuel W. Serrell
atty.

UNITED STATES PATENT OFFICE.

THOMAS ADAMS, OF JERSEY CITY, NEW JERSEY.

IMPROVEMENT IN FEED-BAGS FOR HORSES.

Specification forming part of Letters Patent No. 141,686, dated August 12, 1873; application filed February 11, 1873.

*To all whom it may concern:*

Be it known that I, THOMAS ADAMS, of Jersey City, in the county of Hudson and State of New Jersey, have invented an Improvement in Feed-Bags for Horses, of which the following is a specification:

Feed-bags have been made for horses in which the oats or other feed slides forward as the head is depressed, and in other instances the feed-bag has had an opening, in which there is wire-netting, to allow dust to blow out. These devices are made for effecting a saving in the feed and preventing the horse spilling the same, but they confine the breath, and are hot and uncomfortable for a horse, especially in summer.

My invention is made for preventing the feed being scattered, and at the same time giving free breathing-room for the horse. I make use of a hopper at the back of the feed-bag to contain the oats or other feed, at the bottom of which hopper is an opening for the oats to pass into the feed-bag proper; thereby the oats will only be supplied as rapidly as they are consumed. The front of the feed-bag is left open to freely admit air to the horse's nostrils. By employing the said hopper the feed will only run down as it is consumed; hence, it is practicable to have the front of the feed-bag open without risk of the food being scattered.

Figure 1:
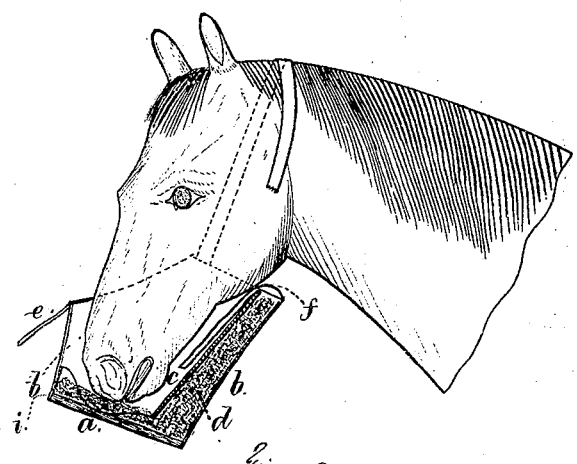
Figure 2:
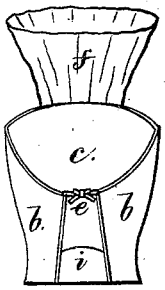

In the drawing, Figure 1 is a vertical section of the said feed-bag as in use, and Fig. 2 is a front elevation of said bag.

The bottom $a$ of the feed-bag is preferably of wood, and from this the sides $b\ b$ extend up and slope to the rear, and form, with the partition $c$, a hopper, $d$, for containing the oats or feed. Suspending straps or cords are employed to sustain this feed-bag from the headstall or other portion of the harness. A strap, $e$, prevents the nose of the horse getting out of the bag, but the opening between the sides $b\ b$ gives opportunity for the breath to escape and the atmosphere to freely reach the horse's nostrils. By means of the strap or connection $e$ the bag can be contracted or expanded to suit the horse's head; hence, it will not hang loosely, as usual, and the front opening will still admit the necessary air to the nostrils. A flexible mouth or bottomless bag, $f$, extends upwardly from the top of the hopper $d$ to form a funnel for directing the feed into the hopper, and also serving to close the upper end of the hopper by reversing the bag and tucking it into the hopper, as seen in Fig. 1, or by turning it inside the feed-bag, or securing the same by a strap.

When in use the feed runs out of the opening between the partition $c$ and bottom $a$ as fast as it is consumed by the horse, and there is no chance for it to be scattered by the ordinary movement of the animal's head, because, as the head is raised up the feed runs back to the mouth of the hopper, and as the head is moved down the feed assumes a position where it can be taken by the horse. The contents of the hopper pass down gradually as consumed.

A small ledge, $i$, at the front edge of the bottom $a$, serves to prevent the oats escaping from the bag at this point.

When the partition $c$ is made of flexible material its lower edge may be kept in place by straps extending to the bottom $a$.

I claim as my invention—

1. A feed-bag, with a hopper at the back part separated from the forward portion of the feed-bag by the partition $c$, at the bottom of which is an opening for the feed, substantially as set forth.

2. A feed-bag with an opening at the front, and with the sides $b\ b$ connected together, substantially as and for the purposes set forth.

Signed this 7th day of February, A. D. 1873.

THOS. ADAMS.

Witnesses:
GEO. T. PINCKNEY,
CHAS. H. SMITH.